(12) United States Patent
Liang et al.

(10) Patent No.: US 9,189,842 B2
(45) Date of Patent: Nov. 17, 2015

(54) PAPER IDENTIFYING METHOD AND RELATED DEVICE

(71) Applicant: GRG Banking Equipment Co., Ltd., Guangzhou, Guangdong (CN)

(72) Inventors: Tiancai Liang, Guangzhou (CN); Dingxi Chen, Guangzhou (CN); Weifeng Wang, Guangzhou (CN); Kun Wang, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 38 days.

(21) Appl. No.: 14/352,302

(22) PCT Filed: Mar. 27, 2013

(86) PCT No.: PCT/CN2013/073247
§ 371 (c)(1),
(2) Date: Apr. 16, 2014

(87) PCT Pub. No.: WO2013/170663
PCT Pub. Date: Nov. 21, 2013

(65) Prior Publication Data
US 2014/0270460 A1  Sep. 18, 2014

(30) Foreign Application Priority Data

May 17, 2012 (CN) .......................... 2012 1 0154819

(51) Int. Cl.
*G06K 9/00* (2006.01)
*G06T 7/00* (2006.01)
(Continued)

(52) U.S. Cl.
CPC .............. *G06T 7/0008* (2013.01); *G06T 7/408* (2013.01); *G07D 7/12* (2013.01); *G07D 7/187* (2013.01)

(58) Field of Classification Search
None
See application file for complete search history.

(56) References Cited

U.S. PATENT DOCUMENTS

| 4,592,090 A | * | 5/1986 | Curl et al. ..................... 382/135 |
| 2004/0131242 A1 | | 7/2004 | Klevtsov |

(Continued)

FOREIGN PATENT DOCUMENTS

| CN | 1132376 A | 10/1996 |
| CN | 101908241 A | 12/2010 |

(Continued)

OTHER PUBLICATIONS

Extended European Search Report dated Apr. 6, 2015 and the European Search Opinion from corresponding European Application No. 13791262.

(Continued)

*Primary Examiner* — Barry Drennan
*Assistant Examiner* — Amandeep Saini
(74) *Attorney, Agent, or Firm* — Wolf, Greenfield & Sacks, P.C.

(57) ABSTRACT

A paper identifying method and a related device, used for accurately identifying soilage conditions of paper according to the recency degree of the paper. The method in an embodiment of the present invention comprises: obtaining a pixel gray value group of an image of input paper, the pixel gray value group being a combination of gray values of sampled pixels of a specified region of the input paper; obtaining an average value of gray values of all pixels in the pixel gray value group, and using same as a first average gray value; comparing the first average gray value with a recency threshold to determine the recency level of the input paper; obtaining the soilage depth of each of N regions of the input paper, the N being an integer greater than or equal to 1; and determining the soilage level of the input paper according to the soilage depth of the N regions, the region area and a soilage threshold, the soilage threshold corresponding to the recency level.

15 Claims, 3 Drawing Sheets

(51) Int. Cl.
  *G07D 7/12*   (2006.01)
  *G07D 7/18*   (2006.01)
  *G06T 7/40*   (2006.01)

(56) References Cited

U.S. PATENT DOCUMENTS

| 2009/0324084 A1 | 12/2009 | Ross et al. |
| 2011/0246278 A1 | 10/2011 | Kubo |
| 2013/0034291 A1 | 2/2013 | Minin et al. |

FOREIGN PATENT DOCUMENTS

| CN | 102236897 A | 11/2011 |
| CN | 102456247 A | 5/2012 |
| CN | 102682514 A | 9/2012 |
| EP | 2557523 A1 | 2/2013 |
| JP | 2004265036 A | 9/2004 |
| WO | WO 2009072211 A | 6/2009 |
| WO | WO 2011/126410 A1 | 10/2011 |

OTHER PUBLICATIONS

Anonymous: "IEEE Xplore Abstract—Research on paper currency recognition by neural networks", Nov. 11, 2003 , XP055180434, Retrieved from the Internet: URL:http://ieeexplore.ieee.org/xpls/abs_al 1.jsp?arnumber-1259870&tag=1 [retrieved on Mar. 31, 2015].

International Search Report dated Jul. 11, 2013from corresponding International Application No. PCT/CN2013/073247.

Wanzheng, Xu, *Dissertation for the Master Degree in Engineering: Banknotes Multi-Spectral Image Analysis, Harbin Institute of Technology*, 1994-2011 China Academic Journal Electronic Publishing House; Harbin Institute of Technoloy; Jun. 27, 2010; 87 pages, with English Abstract.

Yong, Wang, *Dissertation of Master Degree in Engineering: Research on Image Processing Arithmetic and Control Strategy of Bill Sorter*, Institute of Mechanical Design of Zhejiang UniversityFeb. 2004; 84 pages, with English Abstract.

* cited by examiner

PAPER IDENTIFYING METHOD AND RELATED DEVICE

This application is the national phase of International Application No. PCT/CN2013/073247, filed on Mar. 27, 2013, which claims the priority of Chinese patent application No. 201210154819.4, titled "PAPER IDENTIFYING METHOD AND RELATED DEVICE", filed with the State Intellectual Property Office on May 17, 2012, which applications are hereby incorporated by reference to the maximum extent allowable by law.

FIELD OF THE INVENTION

The invention relates to the field of image processing, and particularly to a method for identifying a paper-like medium and a device thereof.

BACKGROUND OF THE INVENTION

With the developments of economy and society, more and more banknotes have been issued and the currency of the banknotes is more frequent. Like those products that are recycled and destroyed after a period of use due to quality degrading, banknotes are also recycled and destroyed if they are degraded in quality after a period of use. Especially in some center branches of banks where a huge amount of banknotes are dealt, in the case that the banknote should be recycled and destroyed due to the stain, it is a tremendous amount of work to select the stained banknotes to be recycled and destroyed from all the banknotes in accordance with their categories. If the task is done manually, it is a laborious and time-consuming task which has a high cost. However, if the task is executed by a machine, the amount of manual labor will be saved, thus greatly reducing the cost of classifying stained banknotes.

In the prior art, a region of a paper on which a stain detection object is located is stored in advance as a detection object region, and the number of pixels of an image printed in the detection object region is stored in advance as a reference pixel number which is used for the comparison.

In practical applications, an aging degree of a paper-like medium to be detected may affect the determination of its stain depth, therefore if the stain determination is performed according to the prior art by using image pixels of a new paper-like medium as reference pixels, errors in the stain determination may be caused in the case where the paper-like medium to be detected is relatively old.

SUMMARY OF THE INVENTION

A method for identifying a paper-like medium and a device thereof are provided according to embodiments of the invention, for accurately identifying the stain situation of a paper-like medium based on an aging degree of the paper-like medium.

The method for identifying the paper-like medium provided by the invention includes: acquiring a group of pixel grayscale values of an image of an inputted paper-like medium, wherein the group of pixel grayscale values is a set of grayscale values of sampling pixels in a region of the inputted paper-like medium; acquiring an average of all pixel grayscale values in the group of pixel grayscale values as a first average grayscale value; comparing the first average grayscale value with an aging threshold to determine an aging level of the inputted paper-like medium; acquiring a stain degree for each of N regions of the input paper-like medium, wherein the N is an integer greater than or equal to 1; and determining a stain level of the inputted paper-like medium according to the stain degree, the area and a stain threshold of each of the N regions, wherein the stain threshold is associated with the aging level.

The device for identifying the paper-like medium provided according to the invention includes: an image acquiring unit adapted to acquire a group of pixel grayscale values of an image of an inputted paper-like medium, wherein the group of pixel grayscale values is a set of grayscale values of sampling pixels in a region of the inputted paper-like medium; a grayscale acquiring unit adapted to acquire an average of all pixel grayscale values in the group of pixel grayscale values as a first average grayscale value; an aging level determining unit adapted to compare the first average grayscale value with an aging threshold to determine an aging level of the inputted paper-like medium; a stain degree acquiring unit adapted to acquire a stain depth for each of N regions of the inputted paper-like medium, wherein the N is an integer greater than or equal to 1; and a stain level determining unit adapted to determine a stain level of the inputted paper-like medium according to the stain depth, the area and a stain threshold of each of the N regions, wherein the stain threshold is associated with the aging level.

As can be seen from the above technical solution, the embodiments of the invention have the following advantages: in the embodiments of the invention, pixel grayscale values in a certain region of an inputted paper-like medium are sampled to form a group of pixel grayscale values, and an aging level of the inputted paper-like medium is determined according to the group of pixel grayscale values of the specified region; then a stain level of the inputted paper-like medium is determined for different regions based on the aging level of the inputted paper-like medium. Since different stain level templates are adopted for different aging levels, the aging degree of the inputted paper-like medium will not affect the determination of the stain level of the inputted paper-like medium, thereby making the stain determination of the input paper-like medium more accurate.

DETAILED DESCRIPTION OF THE INVENTION

A method for identifying a paper-like medium and a method thereof are provided according to embodiments of the invention, for accurately identifying the stain situation of a paper-like medium based on an aging degree of the paper-like medium.

Figure 1:
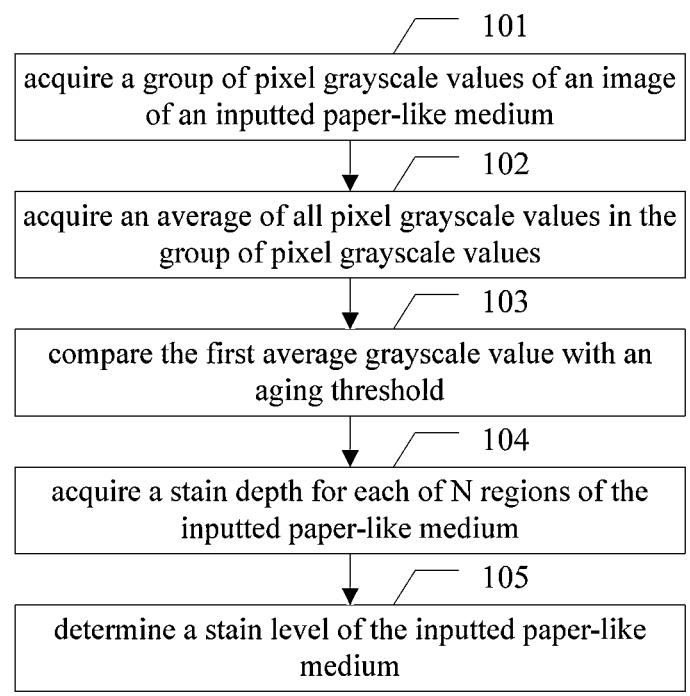
FIG. 1 is a flow chart of a method for identifying a paper-like medium according to an embodiment of the invention.

Referring to FIG. 1, a method for identifying a paper-like medium according to an embodiment of the invention includes step 101~step 105.

Step 101, acquiring a group of pixel grayscale values of an image of an inputted paper-like medium.

The device for identifying a paper-like medium acquires a group of pixel grayscale values of an image of an inputted paper-like medium. The group of pixel grayscale values is a set of grayscale values of sampling pixels in a specified region of the inputted paper-like medium.

Specifically, the inputted paper-like medium may be a banknote.

Depending on actual situations and user's requirements, the specified region may refer to a whole banknote, or may be any partial region of the banknote. Preferably, for easy to the identification, a region with a higher grayscale value may be selected as the specified region.

Optionally, the sampling pixels may be all pixels within the specified region, or may be obtained by sampling the specified region in a certain proportion (such as sampling in a proportion of 1:10).

Optionally, the image of the inputted paper-like medium may be the image of one side of the inputted paper-like medium, or may be the image of both sides of the inputted paper-like medium.

Step 102, acquiring an average of grayscale values of all pixels in the group of pixel grayscale values.

The device for identifying a paper-like medium acquires an average of grayscale values of all pixels in the group of pixel grayscale values and uses the average as a first average grayscale value.

It should be noted that, "first" in the term "first average grayscale value" does not limit an order or a magnitude, which is used only to distinguish between different grayscale values.

Step 103, comparing the first average grayscale value with an aging threshold.

The device for identifying a paper-like medium compares the first average grayscale value with an aging threshold to determine an aging level of the input paper-like medium.

Specifically, the aging threshold is a preset grayscale threshold, and there may be multiple groups of aging thresholds that respectively represent grayscale thresholds associated with different aging degrees.

Step 104, acquiring a stain depth for each of N regions of the input paper-like medium.

The device for identifying a paper-like medium acquires a stain depth for each of N regions of the input paper-like medium, where N is an integer greater than or equal to 1;

Specifically, the N regions may be regions having different grayscale levels (such as a dark region and a light region), or may be regions at different positions of the inputted paper-like medium, which can be determined according to actual needs and determination accuracy, and is not limited here.

Specifically, the stain depth is a parameter indicating a stained degree of the inputted paper-like medium and can be determined according to the difference between the average grayscale value and a standard grayscale value. The specific calculation process of the stain depth is described in the subsequent embodiments, and which will not be limited here.

Step 105, determining a stain level of the inputted paper-like medium.

The device for identifying a paper-like medium determines a stain level of the input paper-like medium according to the stain depth, the area and a stain threshold of each of the N regions, where the stain threshold is associated with the aging level.

Specifically, the stain threshold is a preset grayscale threshold, and there may be multiple groups of stain thresholds which respectively represent grayscale thresholds associated with different stain depths.

In practical applications, in a region, different stain thresholds are associated with different aging levels. That is, in a region, a same average grayscale value will have different stain levels in the case of different aging levels. For example, a region with an average grayscale value of 180 may be determined as being stained in a new banknote, but it may be determined as not being stained in an old banknote.

In the embodiments of the invention, pixel grayscale values in a certain region of an inputted paper-like medium are sampled to form a group of pixel grayscale values, and an aging level of the inputted paper-like medium is determined according to the group of pixel grayscale values of the specified region; then a stain level of the inputted paper-like medium is determined for different regions based on the aging level of the inputted paper-like medium. Since different stain level templates are adopted for different aging levels, the aging degree of the inputted paper-like medium will not affect the determination of the stain level of the input paper-like medium, so as to determine a stain of the inputted paper-like medium accurately.

Figure 2:
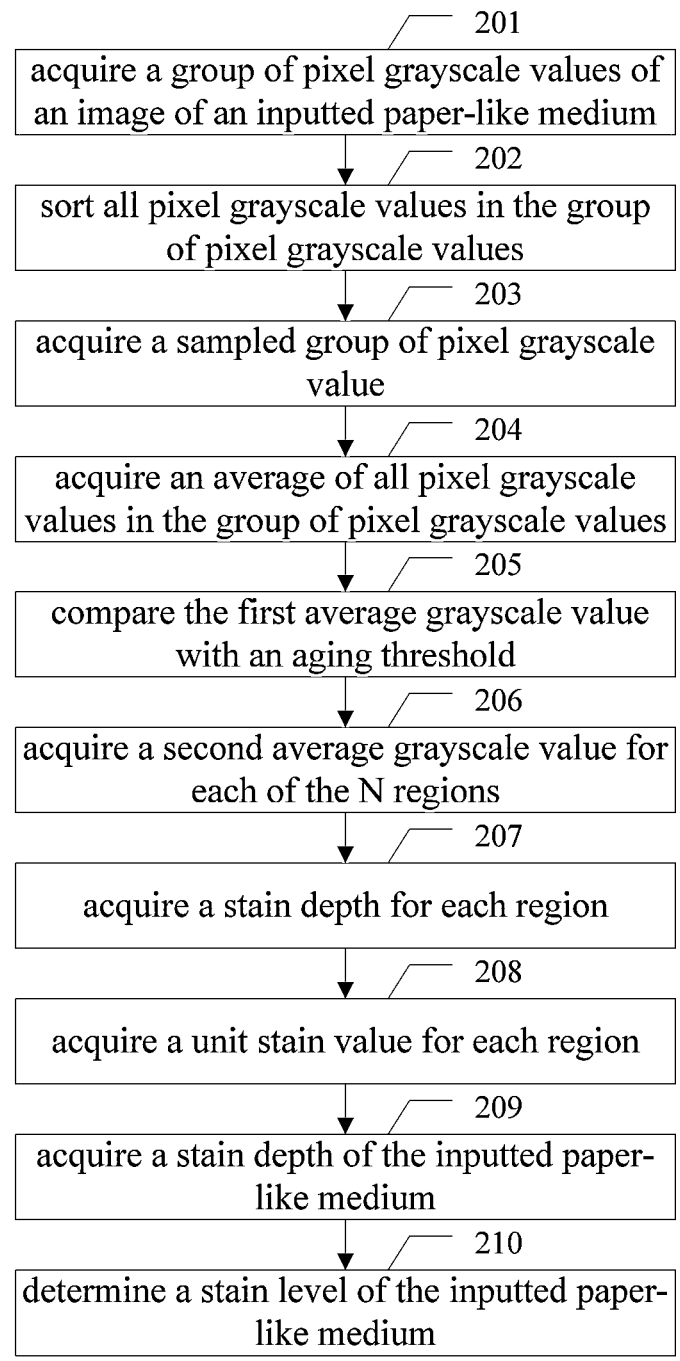
FIG. 2 is another flow chart of a method for identifying a paper-like medium according to an embodiment of the invention.

In practical applications, serious dirt in some small regions may affect determination accuracy of the aging degree. A solution is provided according to the invention, as shown in FIG. 2. A method for identifying a paper-like medium according to another embodiment of the invention includes step 201~step 210.

Step 201, acquiring a group of pixel grayscale values of an image of an inputted paper-like medium.

The content of step 201 in this embodiment is the same as the content of step 101 in the embodiment shown in above FIG. 1, which will not be described in detail herein.

Step 202, sorting grayscale values of all pixels in the group of pixel grayscale values.

The device for identifying the paper-like medium sorts all pixel grayscale values in the group of pixel grayscale values according to the magnitudes of the grayscale values.

Step 203, acquiring a sampled group of pixel grayscale values.

The device for identifying the paper-like medium acquires pixel grayscale values in a middle section of the sorted group of pixel grayscale values to form the sampled group of pixel grayscale values.

Preferably, the middle section may be the middle 60% of the sorted group of pixel grayscale values. That is, the sampled group of pixel grayscale values is obtained by removing pixel grayscale values in the first 20% and the last 20% of the sorted group of pixel grayscale values. Optionally, the middle section may also be from the middle 40% to 80% of the sorted group of pixel grayscale values, which is not limited here.

In the embodiments of the invention, the impacts caused by pixels with an too large grayscale value or an too small grayscale value are eliminated, so as to sample pixels for determining the aging degree reasonably, and determine the aging degree accurately.

Step 204, acquiring an average of grayscale values of all pixels in the sampled group of pixel grayscale values.

The device for identifying the paper-like medium acquires an average of grayscale values of all pixels in the sampled group of pixel grayscale value, as a first average grayscale value.

Step 205, comparing the first average grayscale value with an aging threshold.

The device for identifying the paper-like medium compares the first average grayscale value with the aging threshold to determine an aging level of the inputted paper-like medium.

Specifically, the aging threshold is a preset grayscale threshold. There may be multiple groups of aging thresholds for representing the grayscale thresholds associated with different aging degrees respectively.

Step 206, acquiring a second average grayscale value for each of the N regions.

The device for identifying the paper-like medium acquires a second grayscale threshold for each of the N regions. The expressions "first" and "second" are only used to indicate the average grayscale value for determining the aging degree and the average grayscale value for determining the stain depth respectively.

Optionally, the N regions may be regions with different grayscale levels. Further, besides regions divided based on different grayscale levels (such as a dark region, a light region), regions divided based on the position may also be performed in a region with the same grayscale level. In this way, the inputted paper-like medium may include K grayscale regions with different grayscale levels, and each of the grayscale regions may include n sub-regions, where the product of K and n is equal to the N.

Step 207, acquiring a stain depth for each region.

The device for identifying the paper-like medium acquires a stain depth for each of the N regions according to the second average grayscale value of the region and a corresponding standard grayscale value of the region. The standard grayscale value is a standard grayscale value of the region of the banknote in the case of the current aging degree, which can be obtained by performing a statistics on a large number of banknotes and synthesizing the client's feedback information.

Specifically, a method for calculating the stain depth of a region includes: obtaining a stain depth of a region X by dividing the absolute value of the difference between a second average grayscale value of the region X and a standard grayscale value of the region X by the standard grayscale value of the region X, where the region X is any one of the N regions.

Step 208, acquiring a unit stain value for each region.

The device for identifying the paper-like medium acquires the unit stain value for each of the N regions, where the unit stain value is the product of a stain depth of the region and the area of the region.

Step 209, acquiring a stain depth of the inputted paper-like medium.

The device for identifying the paper-like medium obtains the stain depth of the inputted paper-like medium by dividing the sum of the unit stain values of the N regions by the total area of the N regions.

Step 210, determining a stain level of the inputted paper-like medium.

The device for identifying the paper-like medium determines the stain level of the inputted paper-like medium by comparing the stain depth of the inputted paper-like medium with a stain threshold of the inputted paper-like medium.

To facilitate understanding, in the following, the method for identifying the paper-like medium described in the embodiments above will be described again in detail by a specific application scenario.

(1) A paper-like medium to be identified is provided into a banknote conveying channel, and the process starts.

(2) An image sensor scans the inputted paper-like medium to be identified in the banknote conveying channel, so as to acquire grayscale value data of an image of the inputted paper-like medium.

(3) A first average grayscale value of the inputted paper-like medium is acquired, and the data acquiring region is a region with a higher grayscale value on the both sides of the inputted paper-like medium.

The aging of a banknote is a whole and integrative concept, which focuses on the whole banknote. Therefore, the aging level of the whole banknote can be substantially determined merely by analyzing a local region. For example, we can substantially know a person's skin color by looking a person's face. In addition, after the banknote is used for some time, a region of the banknote with a higher grayscale value will have a greater change than other regions of the banknote. Therefore, the region with a higher grayscale value can reflect the aging degree of a banknote better.

(4) The aging level of the paper-like medium is determined by comparing the first average grayscale value and the stored aging threshold.

Taking a Renminbi banknote as an example, the acquiring regions are watermark regions on both sides of the Renminbi banknote. Taking the Renminbi banknote as an example, a group of pixel grayscale values V1, V2 (V1, V2 respectively represent the pixel grayscale values at the front side and the back side of the banknote) of the watermark regions at both sides of the banknote are acquired. The grayscale values in V1, V2 are sorted respectively to form new groups of pixel grayscale values V11, V21. The pixel grayscale values in the middle 60% section of each group of the pixel grayscale values V11, V21 are acquired to form new pixel grayscale value groups V12, V22. The average v1, v2 of pixel grayscale values V12, V22 are calculated and respectively used as the first average grayscale values of the front side and the back side of the Renminbi banknote.

If the aging degrees of both the front side and back side of the inputted paper-like medium are divided into six aging levels: all new, 90% new, 80% new, 60% new, and no more than 50% new, there are five aging thresholds for the front side p1, p2, p3, p4, p5, where $0 \le p1 < p2 < p3 < p4 < p5 \le 255$. Similarly, there are also five aging thresholds for the back side n1, n2, n3, n4, n5, where $0 \le n1 < n2 < n3 < n4 < n5 \le 255$.

In the case where $0 \le v1 < p1$, the aging level for the front side L1 is no more than 50% new, in the case where $p1 \le v1 < p2$, the aging level for the front side L1 is 60% new, in the case where $p2 \le v1 < p3$, the aging level for the front side L1 is 70% new, in the case where $p3 \le v1 < p4$, the aging level for the front side L1 is 80% new, in the case where $p4 \le v1 < p5$, the aging level for the front side L1 is 90% new, and in the case where $p5 \le v1 \le 255$, the aging level for the front side L1 is all new. Similarly, in the case where $0 \le v2 < n1$, the aging level for the back side L2 is no more than 50% new, in the case where $n1 \le v2 < n2$, the aging level for the back side L2 is 60% new, in the case where $n2 \le v2 < n3$, the aging level for the back side L2 is 70% new, in the case where $n3 \le v2 < n4$, the aging level for the back side L2 is 80% new, in the case where $n4 \le v2 < n5$, the aging level for the back side L2 indicates 90% new, and in the case where $n5 \le v2 \le 255$, the aging level for the back side L2 is all new. The smaller one in the aging levels of L1 and L2 is determined as the aging level L of the inputted paper-like medium.

(5) A second average grayscale value of the input paper-like medium is acquired.

Each of the front side and the back side of the inputted paper-like medium is divided into a bright region a, a light region b, and a dark region c. The a is further divided into x sub-regions a1, a2, ..., ax, and the b is further divided into y sub-regions b1, b2, ..., by, and the c is further divided into z sub-regions c1, c2, ..., cz. Those sub-regions have substantially the same area. The average grayscale value of each sub-region is calculated.

The standard stain data for each sub-region of the inputted paper-like medium in each aging level, i.e., the average grayscale value of each sub-region of the inputted paper-like medium in each aging level, is stored locally.

(6) comparing the second average grayscale value with a stored stain threshold to determine an stain level of the paper-like medium;

The stain level is determined according to the aging level L and a corresponding template data. At first, a stain depth is defined, the stain depth of a certain region deep_stain is defined as a value, which is calculated by dividing the absolute value of the difference between a pixel grayscale value pix and a standard grayscale value pix_std of the corresponding pixel for the inputted paper-like medium in the same aging level by the standard grayscale value pix_std to get a result and obtaining the percentage of the result, i.e., deep_stain=100%*|pix−pix_std|/pix_std. The sum of the product of the area and the stain depth of the each sub-region in the front side or the back side is divided by the total area of the front side or the total area of the back side of an image, so as to obtain the stain depth of the front side or the back side of the image. The stain depth deep_stain of the image is the larger one of the stain depths of the front side and the back side. If the stain depth is divided into four levels, there are three stain thresholds Z1, Z2, Z3 for the template of each aging level, where $0 \leq Z1 < Z2 < Z3 \leq 1$. In the case where $0 \leq$ deep_stain$<Z1$, the stain level of the inputted paper-like medium is 1, in the case where Z1$\leq$deep_stain$<$Z2, the stain level of the inputted paper-like medium is 2, in the case where Z2$\leq$deep_stain$<$Z3, the stain level of the inputted paper-like medium is 3, and in the case where Z3$\leq$deep_stain$\leq$1, the stain level of the inputted paper-like medium is 4.

The application scenario in the embodiments of the invention are illustrated above by only several examples, it should be understood that, there may be more application scenarios in practical applications, which is not limited here.

Figure 3:
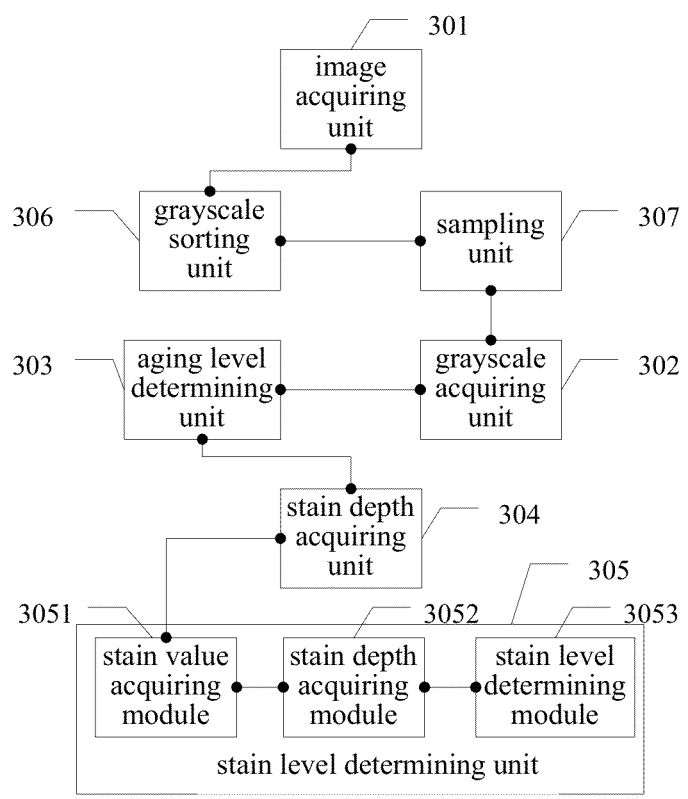
FIG. 3 is a logical structural diagram of a device for identifying a paper-like medium according to an embodiment of the invention.

In the following, a device for identifying a paper-like medium according to the invention which can performs the above-mentioned method for identifying the paper-like medium will be illustrated. The logical structure of the device is shown in FIG. 3. The device for identifying the paper-like medium according to an embodiment of the invention includes:

an image acquiring unit 301 adapted to acquire a group of pixel grayscale values of an image of an inputted paper-like medium, the group of pixel grayscale values being a set of grayscale values of sampled pixels in a region of the inputted paper-like medium;

a grayscale acquiring unit 302 adapted to acquire an average of pixel grayscale values in the group of pixel grayscale value as a first average grayscale value;

an aging level determining unit 303 adapted to determine an aging level of the inputted paper-like medium by comparing the first average grayscale value with an aging threshold;

a stain depth acquiring unit 304 adapted to acquire a stain depth for each of N regions of the inputted paper-like medium, the N being an integer greater than or equal to 1; and a stain level determining unit 305 adapted to determine a stain level of the inputted paper-like medium according to the stain depth, the area and the stain threshold of each of the N regions, the stain threshold being associated with the aging level.

Optionally, the device for identifying the paper-like medium according to the embodiment of the invention further includes:

a grayscale sorting unit 306 adapted to sort all pixel grayscale values in the group of pixel grayscale value according to the magnitudes of the grayscale values; and a sampling unit 307 adapted to acquire pixel grayscale values in a middle section of the sorted group of pixel grayscale values to form a sampled group of pixel grayscale value;

The grayscale acquiring unit 302 is further adapted to acquire an average of all pixel grayscale values in the sampled group of pixel grayscale values as a first average grayscale value.

Optionally, the stain level determining unit 305 according to the embodiment of the invention may further include:

a stain value acquiring module 3051 adapted to acquire a unit stain value for each of the N region, where the unit stain value is the product of the stain depth of the region and the area of the region;

a stain depth acquiring module 3052 adapted to obtain the stain depth of the inputted paper-like medium by dividing the sum of the unit stain values of the N regions by the total area of the N regions; and a stain level determining module 3053 adapted to determine the stain level of the inputted paper-like medium by comparing the stain depth of the inputted paper-like medium with the stain threshold.

A specific interactive process between units in the device for identifying the paper-like medium according to an embodiment of the invention includes the following steps.

The image acquiring unit 301 acquires the group of pixel grayscale values of an image of the inputted paper-like medium, and the group of pixel grayscale values is a set of grayscale values of sampled pixels in a certain region of the inputted paper-like medium.

Specifically, the inputted paper-like medium may be a banknote. Depending on actual situations and user's requirements, the certain region may refer to a whole banknote, or any partial region of the banknote. Preferably, for easy to the identification, a region with a high grayscale value may be selected as the certain region. Optionally, the sampled pixels may be all pixels within the certain region, or may be obtained by sampling pixels in the certain region in a proportion (such as in a proportion of 1:10). Optionally, the image of the inputted paper-like medium may be an image of one side of the inputted paper-like medium, or may be images of both sides of the input paper-like medium.

Optionally, before determining the first average grayscale value, the grayscale sorting unit 306 can sort all pixel grayscale values in the group of pixel grayscale values according to the magnitudes of grayscale values firstly. Then, the sampling unit 307 acquires pixel grayscale values in the middle section of the sorted group of pixel grayscale values to obtain a sampled group of pixel grayscale values. Preferably, the middle section may be the middle 60% of the sorted group of pixel grayscale values. That is, the sampled group of pixel grayscale values is obtained by removing pixel grayscale values in the first 20% and the last 20% of the sorted group of pixel grayscale values. Optionally, the middle section may also be from the middle 40% to 80% of the sorted group of pixel grayscale values, which is not limited here.

The grayscale acquiring unit 302 acquires an average of all pixel grayscale values in the group of pixel grayscale values as the first average grayscale value. The grayscale acquiring unit 302 is also adapted to acquire an average of all pixel grayscale values in the sampled group of pixel grayscale value as the first average grayscale value.

After the first average grayscale value is acquired, the aging level determining unit 303 determines the aging level of the inputted paper-like medium by comparing the first average grayscale value with the aging threshold. Specifically, the aging threshold is a preset grayscale threshold. There may be multiple groups of aging thresholds for representing the grayscale thresholds associated with different aging degrees respectively.

After the aging degree of the inputted paper-like medium is determined, the stain depth acquiring unit 304 acquires a stain depth for each of N regions of the inputted paper-like medium, the N being an integer greater than or equal to 1.

Specifically, the N regions may have different grayscale levels (such as a dark region and a light region), or may be located at different positions of the inputted paper-like medium, which can be determined according to actual needs and a determination accuracy, and is not limited here. Specifically, the stain depth is a parameter for indicating a degree of stain of the inputted paper-like medium, which can be determined according to the difference between the average grayscale value and a standard grayscale value. The specific calculation process is described in the subsequent embodiments, and will not be limited here.

Further, the stain level determining unit 305 determines a stain level of the inputted paper-like medium according to the stain depth, the area and the stain threshold of each of the N regions, where the stain threshold is associated with the aging level. Specifically, the aging threshold is a preset grayscale threshold. There may be multiple groups of aging thresholds for represent grayscale thresholds associated with different aging degrees respectively.

In practical applications, considering different aging levels, different stain thresholds are provided for one region. That is, one region with a same grayscale value will be given different stain levels in the case of the region with different aging levels. For example, it is determined that a region with a grayscale value of 180 is stained in the case of a new banknote, but is not stained in the case of an old banknote.

Specifically, the stain value acquiring module 3501 of the stain level determining unit 305 acquires a unit stain value for each region, where the unit stain value is the product of a stain depth of the region and the area of the region. Then, the stain depth acquiring module 3052 obtains the stain depth of the inputted paper-like medium by dividing the sum of the unit stain values of the N regions by the total area of the N regions. The stain level determining module 3053 determines the stain level of the inputted paper-like medium by comparing the stain depth of the inputted paper-like medium with the stain threshold.

In the embodiments provided by this application, it should be understood that the disclosed device and the method can be implemented in other ways. For example, the device embodiments described above is only illustrative, for example, the division of the units is simply a division in the logical function, and there may be other division ways in practical implementation, for example a plurality of units or components can be combined or integrated into another system, or several features can be ignored, without being performed. In addition, the coupling or direct coupling or communication connection between one another shown or discussed may be done via some interfaces, and indirect coupling or communication connection between devices or units may be performed in an electrical form, a mechanical form, or other forms.

The unit that is illustrated as a separate part may be or not be physically separated, and the component shown as a unit may be or not be a physical unit, that is, it may be located in one place or may be distributed to a plurality of network units. Part or all of the units may be selected according to actual needs to implement the object of the scheme of the embodiments.

In addition, the functional units in the embodiments of the invention may be integrated into one processing unit, or each unit can exit separately, or two or more units may be integrated into one unit. The integrated units described above may be implemented in a form of hardware, or may be implemented in a form of software functional unit.

If the integrated unit is implemented in the form of software functional unit and is sold or used as a separate product, it can be stored in a computer readable storage medium. Based on such understanding, the technical scheme of the invention essentially or its part that provides contribution to the existing technology or all or part of the technical scheme may be expressed in the form of a software product. The computer software product is stored in one storage medium, and includes several instructions which enable a computer (which may be a personal computer, a server, or a network device, etc.) device to execute all or part of steps of the method of each embodiment of the invention. The storage medium described above includes: a USB disk, a mobile hard disk, a Read-Only Memory (ROM), a Random Access Memory (RAM), a magnetic disc or a compact disc and all kinds of mediums which can store program codes, and etc.

The above-mentioned are only specific embodiments of the invention. However, the scope of protection of the invention is not limited thereto, variations and alternatives within the technical scope disclosed in the invention, that can be easily thought by any one of those skilled in the art, should fall within the scope of protection of the invention. Therefore, the scope of protection of the invention should be in accordance with the scope of protection defined by appended claims.

The invention claimed is:

1. A method for identifying a paper-like medium, comprising:
   acquiring a group of pixel grayscale values of an image of an inputted paper-like medium, wherein the group of pixel grayscale values is a set of grayscale values of sampling pixels in a region of the inputted paper-like medium;
   acquiring an average of all pixel grayscale values in the group of pixel grayscale values as a first average grayscale value;
   comparing the first average grayscale value with an aging threshold to determine an aging level of the inputted paper-like medium;
   acquiring a stain depth for each of N regions of the inputted paper-like medium, wherein the N is an integer greater than or equal to 1; and
   determining a stain level of the inputted paper-like medium according to the stain depth, the area and a stain threshold of each of the N regions, the stain threshold being associated with the aging level.

2. The method according to claim 1, further comprising, after the acquiring a group of pixel grayscale values of an image of an inputted paper-like medium,
   sorting all pixel grayscale values in the group of pixel grayscale values according to the magnitudes of the grayscale values;
   acquiring pixel grayscale values in a middle section of the sorted group of pixel grayscale values to form a sampled group of pixel grayscale values;
   wherein the acquiring an average of all pixel grayscale values in the group of pixel grayscale values comprises:
   acquiring an average of all pixel grayscale values in the sampled group of pixel grayscale values.

3. The method according to claim 2, wherein the acquiring a stain depth for each of N regions of the inputted paper-like medium comprises:
   acquiring a second average grayscale value for each of the N regions;

acquiring, for each of the N regions, the stain depth of the region according to the second average grayscale value of the region and a standard grayscale value of the region.

4. The method according to claim 2, wherein the determining a stain level of the inputted paper-like medium according to the stain depth, an area and a stain threshold of each of the N regions comprises:
acquiring a unit stain value for each of the N region, where the unit stain value is the product of the stain depth and the area of the region;
obtaining the stain depth of the inputted paper-like medium by dividing the sum of the unit stain values of the N regions by the total area of the N regions;
comparing the stain depth of the inputted paper-like medium with the stain threshold of the inputted paper-like medium to determine the stain level of the inputted paper-like medium.

5. The method according to claim 2, wherein the N regions have different grayscale levels.

6. The method according to claim 2, wherein the inputted paper-like medium comprises K grayscale regions with different grayscale levels, and each grayscale region comprises n sub-regions, where the product of K and n is equal to N.

7. The method according to claim 1, wherein the acquiring a stain depth for each of N regions of the inputted paper-like medium comprises:
acquiring a second average grayscale value for each of the N regions;
acquiring, for each of the N regions, the stain depth of the region according to the second average grayscale value of the region and a standard grayscale value of the region.

8. The method according to claim 7, wherein the acquiring, for each of the N regions, the stain depth of the region according to the second average grayscale value of the region and a standard grayscale value of the region, comprises: obtaining a stain depth of a region X by dividing the absolute value of the difference between a second average grayscale value of the region X and a standard grayscale value of the region X by the standard grayscale value of the region X, where the region X is any one of the N regions.

9. The method according to claim 1, wherein the determining a stain level of the inputted paper-like medium according to the stain depth, an area and a stain threshold of each of the N regions comprises:
acquiring a unit stain value for each of the N region, where the unit stain value is the product of the stain depth and the area of the region;
obtaining the stain depth of the inputted paper-like medium by dividing the sum of the unit stain values of the N regions by the total area of the N regions;
comparing the stain depth of the inputted paper-like medium with the stain threshold of the inputted paper-like medium to determine the stain level of the inputted paper-like medium.

10. The method according to claim 1, wherein the N regions have different grayscale levels.

11. The method according to claim 1, wherein the inputted paper-like medium comprises K grayscale regions with different grayscale levels, and each grayscale region comprises n sub-regions, where the product of K and n is equal to N.

12. A device for identifying a paper-like medium, comprising:
an image acquiring unit adapted to acquire a group of pixel grayscale values of an image of an inputted paper-like medium, wherein the group of pixel grayscale values is a set of grayscale values of sampling pixels in a region of the inputted paper-like medium;
a grayscale acquiring unit adapted to acquire an average of all pixel grayscale values in the group of pixel grayscale value as a first average grayscale value;
an aging level determining unit adapted to compare the first average grayscale value with an aging threshold to determine an aging level of the inputted paper-like medium;
a stain depth acquiring unit adapted to acquire a stain depth for each of N regions of the inputted paper-like medium, wherein the N is an integer greater than or equal to 1; and
a stain level determining unit adapted to determine a stain level of the inputted paper-like medium according to the stain depth, the area and a stain threshold of each of the N regions, wherein the stain threshold is associated with the aging level.

13. The device according to claim 12, further comprising:
a grayscale sorting unit adapted to sort all pixel grayscale values in the group of pixel grayscale values according to the magnitudes of the grayscale values; and
a sampling unit adapted to acquire pixel grayscale values in a middle section of the sorted group of pixel grayscale values to form a sampled group of pixel grayscale value,
wherein the grayscale acquiring unit is further adapted to acquire an average of all pixel grayscale values in the sampled group of pixel grayscale values as a first average grayscale value.

14. The device according to claim 13, wherein the stain level determining unit comprises:
a stain value acquiring module adapted to acquire a unit stain value for each of the N region, where the unit stain value is the product of the stain depth of the region and the area of the region;
a stain depth acquiring module adapted to obtain the stain depth of the inputted paper-like medium by dividing the sum of the unit stain values of the N regions by the total area of the N regions; and
a stain level determining module adapted to compare the stain depth of the inputted paper-like medium with the stain threshold of the inputted paper-like medium to determine the stain level of the inputted paper-like medium.

15. The device according to claim 12, wherein the stain level determining unit comprises:
a stain value acquiring module adapted to acquire a unit stain value for each of the N region, where the unit stain value is the product of the stain depth of the region and the area of the region;
a stain depth acquiring module adapted to obtain the stain depth of the inputted paper-like medium by dividing the sum of the unit stain values of the N regions by the total area of the N regions; and
a stain level determining module adapted to compare the stain depth of the inputted paper-like medium with the stain threshold of the inputted paper-like medium to determine the stain level of the inputted paper-like medium.

* * * * *